United States Patent
Badovinatz et al.

(10) Patent No.: US 7,865,478 B2
(45) Date of Patent: Jan. 4, 2011

(54) BASED ON REPEATED EXPERIENCE, SYSTEM FOR MODIFICATION OF EXPRESSION AND NEGATING OVERLOAD FROM MEDIA AND OPTIMIZING REFERENTIAL EFFICIENCY

(75) Inventors: Peter R. Badovinatz, Beaverton, OR (US); Veronika M. Megler, Oak Grove, OR (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 11/144,485

(22) Filed: Jun. 4, 2005

(65) Prior Publication Data

US 2006/0277191 A1 Dec. 7, 2006

(51) Int. Cl.
*G06F 17/00* (2006.01)
*G06F 15/16* (2006.01)

(52) U.S. Cl. ............................ 707/689; 725/25; 725/32; 725/86; 709/204; 345/631

(58) Field of Classification Search ................. 709/206, 709/219, 204; 710/33; 715/708, 719; 707/200, 707/689, 999.01–999.206; 379/93; 1/1; 345/631; 725/25, 32, 86

See application file for complete search history.

(56) References Cited

U.S. PATENT DOCUMENTS

| | | | |
|---|---|---|---|
| 5,487,167 A * | 1/1996 | Dinallo et al. | 715/203 |
| 5,778,053 A * | 7/1998 | Skarbo et al. | 379/93.21 |
| 6,151,630 A * | 11/2000 | Williams | 709/229 |
| 6,324,569 B1 * | 11/2001 | Ogilvie et al. | 709/206 |
| 6,366,882 B1 | 4/2002 | Bijl et al. | |
| 6,513,006 B2 | 1/2003 | Howard et al. | |
| 6,694,307 B2 | 2/2004 | Julien | |
| 6,889,383 B1 * | 5/2005 | Jarman | 725/28 |
| 2003/0140121 A1 * | 7/2003 | Adams | 709/219 |
| 2004/0019905 A1 | 1/2004 | Fellenstein et al. | |
| 2004/0168121 A1 | 8/2004 | Matz | |
| 2004/0189696 A1 | 9/2004 | Shirriff | |
| 2004/0201608 A1 * | 10/2004 | Ma et al. | 345/719 |
| 2004/0221311 A1 * | 11/2004 | Dow et al. | 725/52 |
| 2004/0267600 A1 * | 12/2004 | Horvitz | 705/10 |
| 2005/0216837 A1 * | 9/2005 | Washburn | 715/708 |
| 2006/0020962 A1 * | 1/2006 | Stark et al. | 725/32 |
| 2006/0224783 A1 * | 10/2006 | Sakoh et al. | 710/33 |

OTHER PUBLICATIONS

Evgeniy Gabrilovich et al., Newsjunkie: Providing personalized newsfeeds via analysis of information novelty, Proceedings of WWW 2004, May 17-22, 2004, New York, NY.

* cited by examiner

*Primary Examiner*—Tony Mahmoudi
*Assistant Examiner*—Dennis Truong
(74) *Attorney, Agent, or Firm*—Steven Lieske Bennett (57) ABSTRACT

Content items are revealed to a user based on whether they have been previously reviewed by the user. A number of content items are thus received over time. The content items may be discrete content items, or may be portions of a content stream, and may be received over different media. For each content item, it is determined whether the content item was previously reviewed by a user. Where the content item was not previously reviewed, the item is revealed to the user, such as by being displayed or announced to the user. Where the content item was previously reviewed, the item is hidden from the user, such as by being deleted, by being replaced with an alternative content item, and so on.

15 Claims, 5 Drawing Sheets

BASED ON REPEATED EXPERIENCE, SYSTEM FOR MODIFICATION OF EXPRESSION AND NEGATING OVERLOAD FROM MEDIA AND OPTIMIZING REFERENTIAL EFFICIENCY

FIELD OF THE INVENTION

The present invention relates generally to the management of information content, and more particularly to such content management in which content items are revealed to the user based on whether they have been previously reviewed by the user.

BACKGROUND OF THE INVENTION

Many people today constantly live in a state of information overload. For example, they receive emails at work and at home. They watch television programs at home and listen to the radio in their cars. People have to review voicemail messages left at their home numbers, at their cell phone numbers, and at their work numbers. They have to participate in teleconferences and videoconferences at work. As a final example, people review web sites and weblogs throughout the day, both at home and at work. They may further download and read electronic books, known as "e-books," via specialized electronic book reading devices.

There is some prior art to select which information people are exposed to, and how they are exposed to such information. For example, email filters ensure that important messages from coworkers and bosses are flagged or placed in special folders to be reviewed first. Alternatively, users may receive alerts on cell phones, pagers, or personal digital assistant (PDA) devices when certain messages are received.

Users also have been able to select which types of information they are exposed to, based on predefined interests or exposure patterns. For example, personal or digital video recorders record only those television programs that a user has selected, or those television programs that are likely to interest the user. As a result, the user does not have to scan through tens or hundreds of different television channels to select a program to watch.

As another example, many electronic-shopping web sites on the Internet are geared to showing users other potential items to buy based on previously purchased or browsed items. A user who is interested in and has purchased computer-networking books, for example, may be shown other types of computer-networking books that he or she might be interested in buying. Sophisticated methodologies can be put in place, so that a user who has purchased one or more types of books may be shown books of a completely different type but in which the user is likely to have an interest.

However, none of the prior art solutions addresses the problem that people are often exposed to the same information throughout the day. A person may bring up a news Internet web site throughout the day, for instance, to learn the latest headlines. More often than not, however, the news items are substantially the same as they were the last time the user checked them. As a result, the user is constantly barraged with news items that he or she may be interested in, but has already reviewed.

As another example, email messages may arrive that, while not exactly duplicative, contain essentially the same information. The user is forced to parse through these messages to determine whether there is any unique content. As a further example, a person may have a series of teleconferences on the same subject matter, with the same or a different group of people participating in each conference. The user is likely to be exposed to the same information on this subject in the same or different teleconferences, which can be frustrating.

For these and other reasons, therefore, there is a need for the present invention.

SUMMARY OF THE INVENTION

The present invention relates to revealing content items to a user based on whether they have been previously reviewed by the user. A method of the invention receives a number of content items over time. The content items may be discrete content items, or may be portions of a content stream, and may be received over different media. For each content item, the method determines whether the content item was previously reviewed by a user. Where the content item was not previously reviewed, the item is revealed to the user, such as by being displayed or announced to the user. Where the content item was previously reviewed, the item is hidden from the user, such as by being deleted, by being replaced with an alternative content item, and so on.

A more specific method of the present invention is performed as an audio and/or video stream is being played. Whether a current portion of the stream relates to subject matter to which the user was previously exposed is determined. Where the user was previously exposed to this portion of the audio and/or video stream, it is played in accordance with a first manner. For example, the stream portion may be removed, played at a reduced volume, it may be muted, or a different audio and/or video stream may be played in lieu of the current portion of the stream. Where the current portion of the audio and/or video stream does relate to subject matter to which the user has not been previously exposed, it is played in accordance with a second manner. For example, the current portion of the stream may be played at a normal volume level.

A system of the invention includes a communication mechanism, a parsing mechanism, and a revelation mechanism. The communication mechanism receives a number of content items. The parsing mechanism determines whether a user has been previously exposed to each content item. The revelation mechanism reveals each content item to the user in one of at least two different manners, based on whether the user was previously exposed to the content item.

Similarly, an article of manufacture of the invention includes a computer-readable medium, and means in the medium. The computer-readable medium may be a recordable data storage medium, a modulated carrier signal, or another type of computer-readable medium. The means is for determining whether each of a number of content items was previously reviewed by a user, and for revealing each content item to the user in one of at least two different manners, based on whether the content item was previously reviewed by the user.

Embodiments of the invention provide for advantages over the prior art. Whereas prior art approaches used in electronic-commerce web sites, personal or digital video recorders, and email filters select the most relevant content items to the user, such that the content items selected are those that a user wishes to have revealed to him or her, the invention operates in an opposite, albeit complementary, manner. The invention hides from the user content that the user has already reviewed, such as content that the user has already seen or heard. The content that undergoes such a winnowing process by the invention may be the type of content that the user wishes to see or hear, as in the prior art. However, the invention ensures that the user does not see or hear content that he or she has previously seen or heard.

Consider the example of news items on a news-aggregation web site. A user may visit such a web site throughout the day to keep apprised of the current day's news. From visit to visit, however, most of the news items do not change, such that the user is usually exposed to the same news items as in his or her previous visit to the site. Thus, an embodiment of the invention ensures that the news items to which the user was exposed in a previous visit to the web site are not again displayed to the user. In a specific embodiment, news items may be parsed to ensure that they do not contain updated information regarding a story, even if they are with respect to a previously reviewed story, so that the user does not miss updates to an ongoing news event. In particular, the changes to a given news item as it is updated throughout the day, for instance, are shown to the user only if they are semantically additive. That is, if the changes in the news item as the news item is updated are relatively "trivial," such as adding a different byline to the news item, or replacing the phrase "2%" with "two percent," then such changes are not considered to be substantive updates to the item that warrant exposure to the user.

As another example, consider a long teleconference call with many people participating. The user may be exposed to the same information repeatedly throughout the call. However, an embodiment of the invention may mute, or reduce the volume of, the teleconference call if the participants are currently discussing a topic that has been discussed before. When the topic of discussion shifts to something that the user has not heard before, then the invention may un-mute, or increase the volume of, the teleconference call. In a specific embodiment, a topic of discussion is considered to have been heard by the user previously if the speaker is the same speaker who had earlier talked about the topic. Thus, if one person talks about something, and then another person discusses the same thing this embodiment would not mute the second speaker.

These and other embodiments of the invention therefore provide another mechanism by which users are able to manage information overload. Information, or content items, that have been presented to the user before are not re-presented to the user, so that the user can concentrate on reviewing new information. One embodiment of the invention may be multi-modal, such that it tracks the content items to which a user has been exposed (i.e., the content items that the user has already reviewed) across different media over which the content items are received. For example, this embodiment may determine that a user has seen a particular news item on a television news program in the morning, and therefore hides the same news item from web sites that the user may visit throughout the day, where the news item does not change throughout the day.

Still other aspects, advantages, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
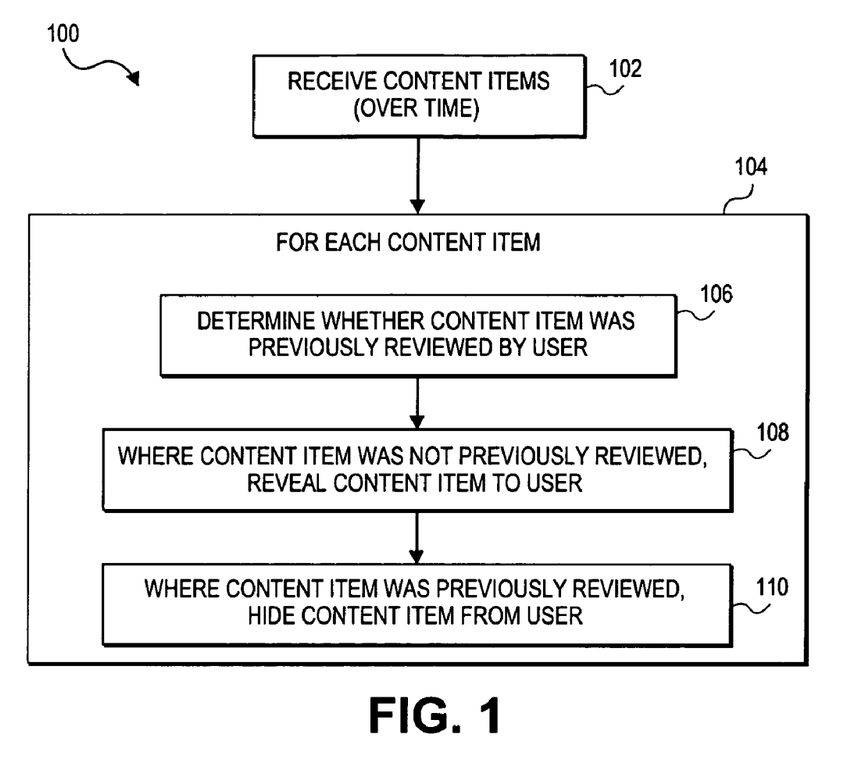
FIG. 1 is a flowchart of an overview method for revealing content items to a user based on whether they have been previously reviewed by the user, according to an embodiment of the invention, and is suggested for printing on the first page of the patent.

FIG. 1 shows an overview method 100 for revealing content items to a user based on whether they have been previously reviewed by the user, according to an embodiment of the invention. Like other methods of the invention, at least some parts of the method 100 may be implemented as one or more computer programs or computer program parts that are stored on a computer-readable medium. The medium may be a volatile or a non-volatile medium, and may also be a magnetic, optical, and/or semiconductor medium, as can be appreciated by those of ordinary skill within the art.

Over time, the method 100 receives content items (102). The content items may be received in different modalities, over different media. That is, multiple sources of content items may be aggregated by the method 100. For instance, the content items may be received over computer connections, telephony networks, cable or satellite television, and so on. The content items may be discrete content items, such as email, news articles received over the Internet, weblog, or "blog," items, newsgroup items, images, web pages, audio files or items, cellular and landline telephone voicemail messages, video files or items, and so on. The content items may alternatively or additionally be part of a content stream, such that each content item is a portion of the content stream. Such content streams can include audio streams, audio recordings, telephone calls, telephone messages, telephone recordings, conference call recordings, video recordings, text streams, text recordings, text messages or messaging streams, and so on.

The following is then performed for each content item (104). The method 100 determines whether the content item was previously reviewed by the user (106). For instance, the method 100 may determine whether the content was displayed, announced, or shown to the user, such that the user was exposed to the content. The method 100 may determine whether the content item was actively selected by the user, such as a news story on an Internet web page, or an email message. The method 100 therefore determines whether the user has previously reviewed the content item in such or different manners.

In one embodiment, determining whether the content item was previously reviewed by the user can include determining whether the content item is an update of a previous content item. At least the new portions of the content item are then considered as having not been reviewed previously by the user. For example, a news story may start at the beginning of the day as "child gets lost." Later in the day the news story may be updated so that it includes the information that "an amber alert has been signaled." Finally, the news story may wrap up later that day as "child is found." Each of the news stories relates to the same child, and therefore may be considered the same content item. However, when the content item is updated with new information, at least that part of the content item is considered to have not been previously reviewed by the user.

For instance, at 10 AM the content item may be that the "child gets lost," and may be presented to the user on a news web site, such that the user reviews the content item as a new content item. At 10:30 AM the content item is the same, and when the user browses the news web site, the content item is not displayed to the user, because it has been previously reviewed by the user. At 1 PM the content item may then be updated to include the information that "an amber alert has been signaled." When the user next browses the news web site, the content item is again displayed to the user, either in its entirety, or only the information as to the fact that an amber alert has been signaled. This is because there is some new information present in the content item. Similarly, if at 5 PM the content item is updated to include "child is found," the content item may again be displayed to the user.

Furthermore, in one embodiment, determining whether the content item was previously reviewed by the user can include determining how long ago the content item was previously reviewed by the user. The content item may thus be considered as not having been reviewed by the user if the content item was previously reviewed by the user a length of time ago, based on a number of parameters. These parameters may include interrelated parameters, including a threshold length of time, the user's interest level in the content item, and so on.

For example, a user may be particularly interested in dogs, but not in cats. A first content item relating to dogs may be displayed to the user, such that the user is considered to have reviewed it, and the content item is no longer displayed to the user. A second content item relating to cats may also be displayed to the user, such that the user is considered to have reviewed it, and the content item is no longer displayed to the user. The user may have a threshold length of time for the re-presentation of already reviewed items of one day for content items relating to subject matter of interest, and three days for content items relating to subject matter that is not of interest.

Two days after the user first saw the first and the second content items the method 100 may again receive these content items. The user is considered to have not previously reviewed the first content item relating to dogs, because the last time the user saw the first content item, two days ago, is greater than the threshold length of time of one day for content items in which the user has an interest. By comparison, the user is considered to still have previously reviewed the second content item relating to cats, because the last time the user saw the second content item, two days ago, is still less than the threshold length of time of three days for content items in which the user does not have an interest.

Furthermore, it is noted that whether a user has been considered as having previously reviewed a content item can be expressed as a combination of degree of change in the content item versus previously reviewed content items, versus the length of time that has elapsed since the last time the user previously reviewed the content items. For example, if the second content item relating to dogs changes less than a threshold percentage, for example twenty percent, as compared to the first content item relating to dogs, then the second content item may still be considered as having been previously reviewed when the second content item is received one day after the first content item. However, if the second content item changes greater than the threshold percentage, then it may not be considered as having been previously reviewed, even if the second content item is received one day after the first content item.

In other words, there can be a secondary time limit, or other such mechanism, that can degrade the change percentage threshold over time. Thus, if two content items are received in relatively short order, the second content item needs to have relatively greater changes in relation to the first content item to be considered as not having been previously reviewed, as compared to the situation where the second content item is received a long time after the first content item. In this latter situation, a long period of time between the receiving of the two content items can mean that the second content item is considered as not having been previously reviewed, even if it contains nearly the same subject matter as the first content item, with little or no change.

Once it has been determined whether a user has previously reviewed a given content item, the method 100 reveals the content item to the user where the content item was considered as not having been previously reviewed by the user (108). Revealing the content item to the user, such that the user is exposed to the content item, can take many different forms. The content item may be displayed, announced, or shown to the user based on the type of content item it is, for instance. By comparison, the method 100 hides, or does not reveal, the content item to the user where it is considered as having been previously reviewed by the user (110).

In one embodiment, such a content item that has been previously reviewed by the user is simply deleted. Alternatively, the content item may not be deleted, but still not be displayed, announced, or shown to the user. Other ways to hide the content item are also possible. For example, a user may have an all-news television channel on during the day, where the news program substantially repeats on a half-hour basis, with new stories added and old stories removed throughout the day. When the user first turns on the television, he or she may hear all the news stories. However, as the news stories are repeated, those stories that the user has previously seen (viz., that he or she has previously reviewed) are muted. That is, the volume of the television is reduced partially or completely, so as not to disturb the user with stories that he or she has already seen.

Furthermore, in another embodiment, alternative content may be revealed or played to the user instead of the content item that has previously been reviewed by the user. For example, a teleconference phone call may be considered as having many different portions, each of which is a separate content item. The same subject matter of the teleconference may be repeated throughout the conference. When the current topic of discussion—that is, the current content item—is a rehash of something that has already been talked about in the conference, hiding such a content item from the user may entail playing music so that the user does not have to listen to the conference call. Such music is alternative content that is played to the user in lieu of the content item.

Figure 2:
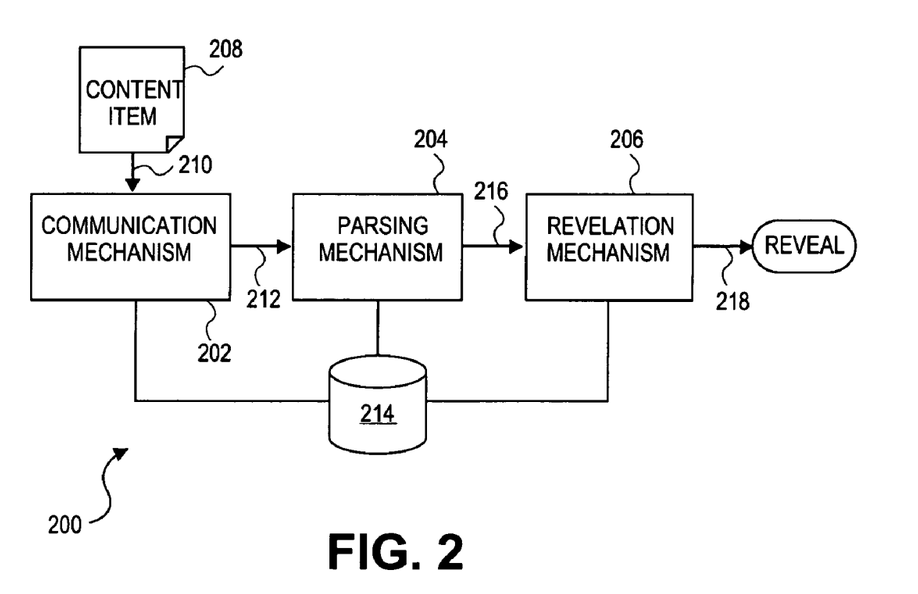
FIG. 2 is a diagram of a rudimentary system for revealing content items to a user based on whether they have been previously reviewed by the user, according to an embodiment of the invention.

FIG. 2 shows a rudimentary system 200 for revealing content to a user according to an embodiment of the invention. The system 200 includes a communication mechanism 202, a parsing mechanism 204, and a revelation mechanism 206 in its most basic form. Each of these mechanisms 202, 204, and 206 may be implemented in hardware, software, or a combination of hardware and software. As can be appreciated by those of ordinary skill within the art, the system 200 can further have additional components or mechanisms, in addition to and/or in lieu of those depicted in FIG. 2.

The communication mechanism 202 receives a number of content items, such as the content item 208, as indicated by the arrow 210. As has been noted, the content item 208 may be any of a variety of different types of content, may be a portion of a stream of content in one embodiment, and may be received over a variety of different media. The parsing mechanism 204 receives the content item 208 from the communication mechanism 202. The parsing mechanism 204 determines whether the user has been previously exposed to the content item, as has been described in relation to FIG. 1. The parsing mechanism 204 may thus rely upon a storage 214 of previously reviewed content items to which the user has already been exposed. The storage 214 may be purged on a rolling basis, such that content item that have been previously reviewed are stored in the storage 214 for at most a given length of time. The storage 214 may be a volatile or a non-volatile computer-readable medium.

For example, the parsing mechanism 204 may determine whether the user was previously exposed to the content item 208 based whether the content item 208 was previously selected by the user. The parsing mechanism 204 may make its determination based on whether the content item 208 is an updated of a previous content item, such that at least new portions of the content item 208 are considered as not having been reviewed by the user. The parsing mechanism 204 may further make its determination based on how long ago the user was previously exposed to the content item 208, such that the user is considered as not having been exposed to the item 208 where he or she was previously exposed to the item 208 a length of time ago, as has been described in relation to FIG. 1.

Once the parsing mechanism 204 makes this determination, it passes the content item 208 to the revelation mechanism 206, as indicated by the arrow 216. The revelation mechanism 206 reveals the content item 208 to the user in at least one of two different manners, based on whether the user was previously exposed to the content item 208, as determined by the parsing mechanism 204. For instance, where the user was not previously exposed to the content item 208, one manner by which the revelation mechanism 206 reveals the content item 208 to the user is to display, announce, or show the content item 208 to the user, as indicated by the arrow 218. As another example, where the user was previously exposed to the content item 208, manners by which the revelation mechanism 206 reveal the content 208 to the user is to not display, not announce, or not show the content item 208 to the user, or play alternative content instead. Thus, the hiding of the content item 208 from the user is itself considered a manner of revealing the content item 208 to the user.

General Embodiments

Figure 3:
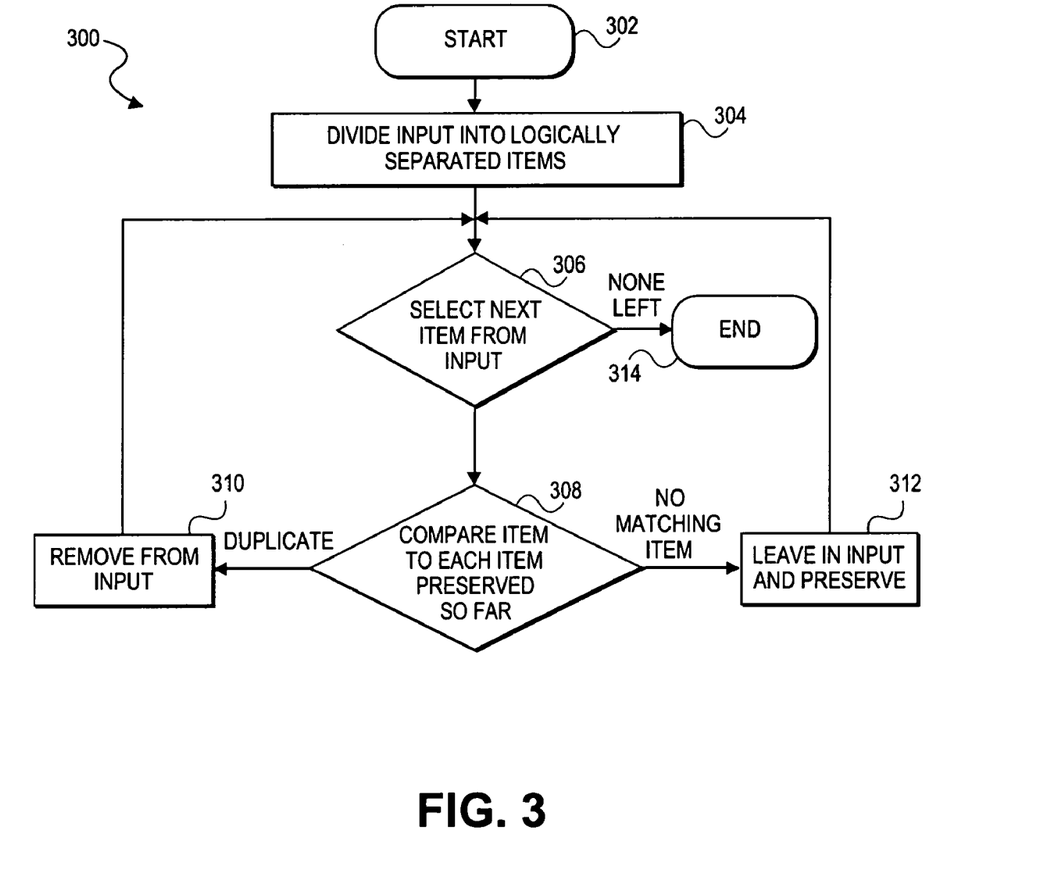
FIG. 3 is a flowchart of a method for revealing content to a user based on whether the content has been previously exposed to the user, according to a general embodiment of the invention.

FIG. 3 shows a general method 300 for exposing content to a user based on whether the user has previously reviewed that content, according to an embodiment of the invention. The method 300 is consistent with the method 100 of FIG. 1. The method 300 starts (302), by dividing input received into logically separate content items (304). These content items may be discrete content items, such as separate email messages, separate news headings, as well as portions of a content stream, as has been described. A first content item is retrieved from the input (306), and is compared to each of the previously received content items (308).

If there is a match between the content item retrieved and the previously received content items, then the content item is removed from the input (310), and the method 300 repeats at 306 with the next content item in the input. However, if there is not a match between the content item retrieved and the previously received content items, then the content item is left in the input (312), and preserved for future comparison, and the method 300 again repeats at 306 with the next content item in the input. At some point, there are no further items in the input, and the method 300 ends (314).

The comparison of content items performed in 308 can be as rudimentary as using a UNIX-style "diff" tool, as can be appreciated by those of ordinary skill within the art. That is, the comparison of content items may be simply to determine whether exact duplicates are identified. Additional refinements in other embodiments of the invention may then be employed to remove content items that are substantially similar, but not 100% identical, to previously received content items. For example, one content item may spell out numbers, whereas another content item may not. In one embodiment, if two content items are more than a certain threshold the same, they are considered the same for purposes of the comparison in 308.

Figure 4:
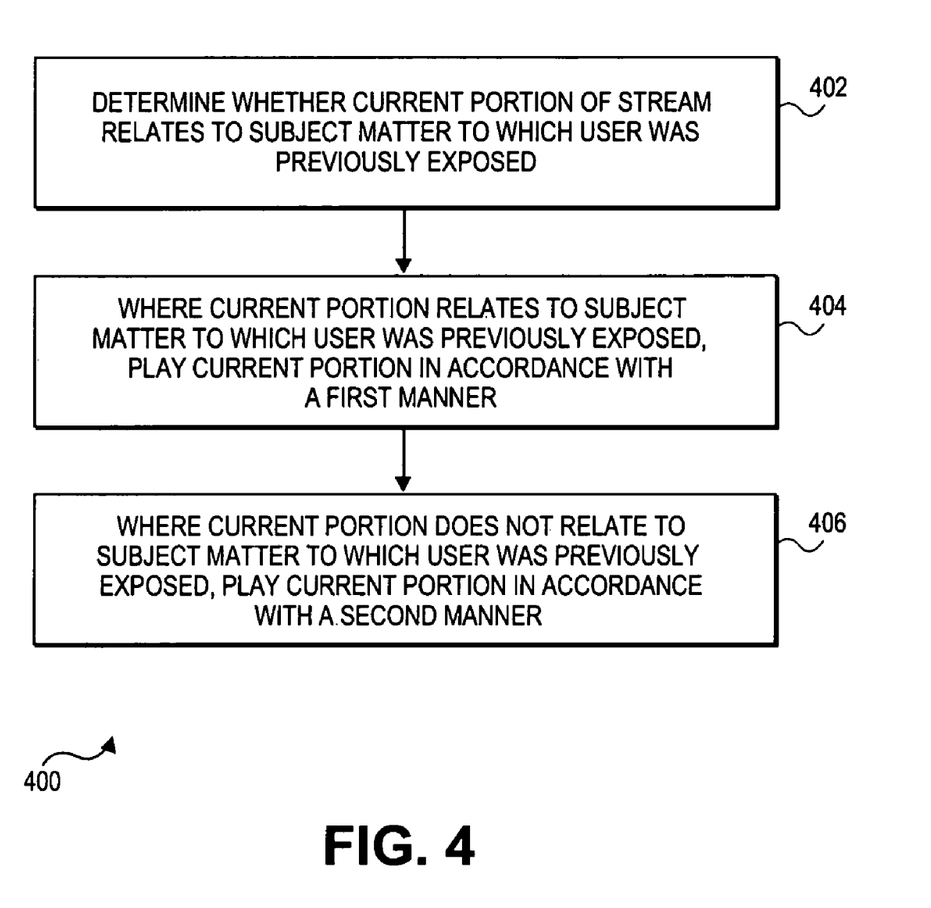
FIG. 4 is a flowchart of a method for revealing content to a user based on whether the content has been previously exposed to the user, and where the content is specifically a content stream divisible into content stream portions, according to an embodiment of the invention.

FIG. 4 shows a general method 400 for exposing content to a user based on whether the user has previously reviewed that content, where the content is specifically and audio and/or video stream, according to an embodiment of the invention. Such an audio and/or video stream is more generally referred to as a content stream. A content stream may be a telephone call, a telephone conference, the stream of audio or video, a television program being watched, and so on. The content stream is divisible into a number of portions, such that the method 400 is performed, preferably in real-time, in relation to each portion as it is current.

The method 400 therefore determines whether a current portion of the stream relates to subject matter to which the user was previously exposed (402). Where it does, the current portion is played to the user in accordance with a first manner (404). For instance, the current portion may be played back at a reduced volume level, the audio may be muted, and/or a different content stream, such as music, may be played back in lieu of the current content stream portion. Where the current portion does not relate to subject mater to which the user was previously exposed, it is played to the user in accordance with a second manner (406). For instance, the current portion may be played back at a normal volume level.

Email Message Embodiment

Figure 5:
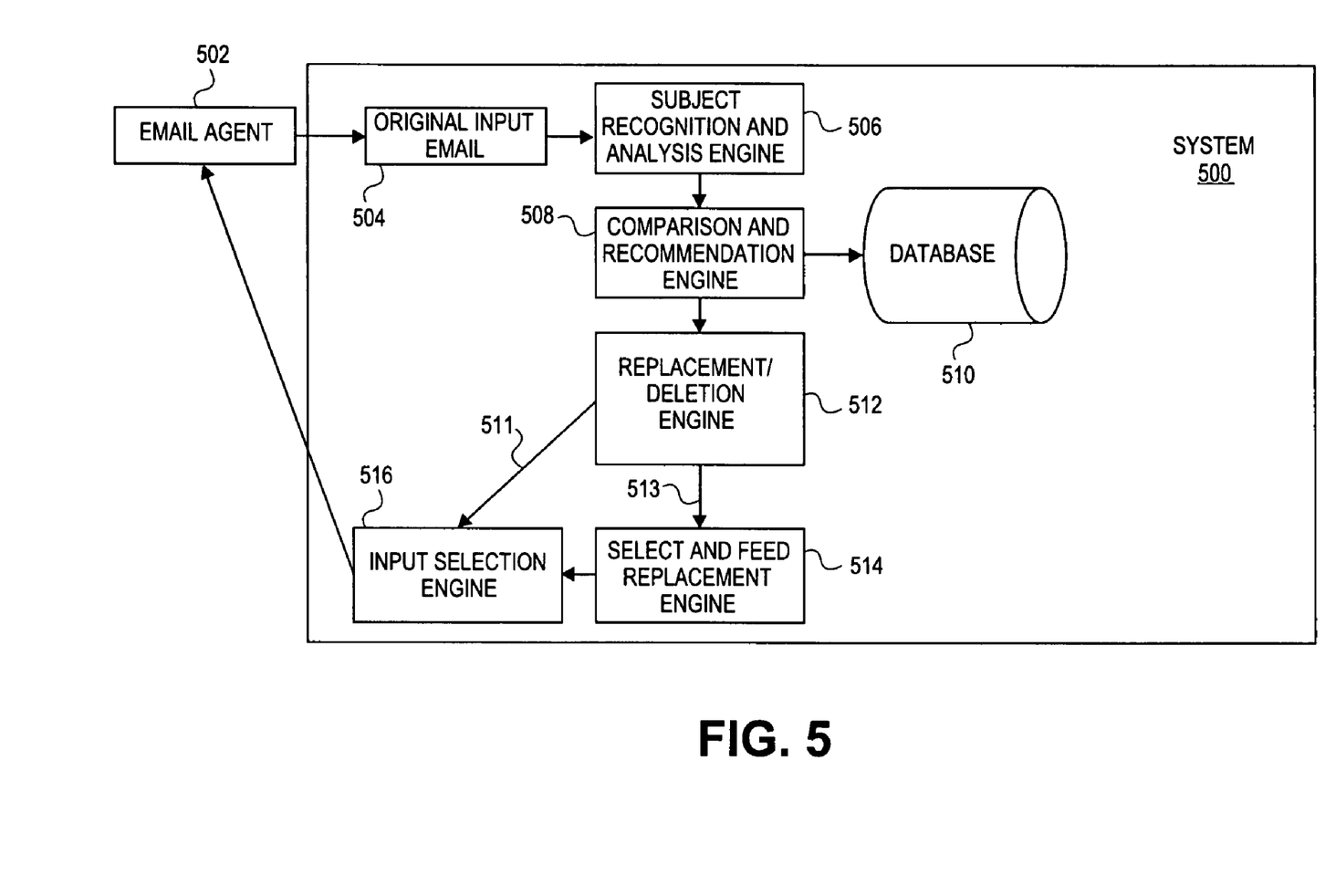
FIG. 5 is a diagram for revealing content items to a user based on whether they have been previously reviewed by the user, where the content items in question are email messages, according to an embodiment of the invention.

FIG. 5 shows a system 500 that can be employed for revealing content items to a user based on whether they have been previously reviewed by the user, in relation to content items that are email messages, according to an embodiment of the invention. The system 500 is consistent with the system 200 of FIG. 2 that has been described. For instance, in one embodiment, the communication mechanism 202 of FIG. 2 can be or encompass the subject recognition and analysis engine 506 of FIG. 5. The parsing mechanism 204 of FIG. 2 can be or encompass the comparison and recommendation engine 508, the replacement/deletion engine 512, and the select-and-feed replacement engine 514 of FIG. 5. Finally, the revelation mechanism 206 of FIG. 2 may be or encompass the input selection engine 516 of FIG. 5.

The system 500 is provided email messages 504 by an email agent 502. The email agent 502 may be an email application program commonly available as stand-alone computer programs and as part of office suites of computer programs. The email agent 502 may be provided with a custom plug-in to provide the functionality of sending the email messages 504 to the system 500.

The subject recognition and analysis engine 506 is a component or mechanism implemented in software, hardware, or a combination of software and hardware that divides the email messages 504 into separate emails, and potentially organizes them by subject matter, and so on. The comparison and recommendation engine 508 may also be a component or mechanism implemented in software, hardware, or a combination of software and hardware. The comparison and recommendation engine 508 compares each of the email messages 504 with email messages to which the user has been previously exposed, as has been described.

In one embodiment, the engine 508 can employ a database 510 when performing its functionality. The database 510 can store the previously reviewed email messages in one embodiment. However, in another embodiment, the database 510 contains the essential aspects of the information within the previously reviewed email messages. Thus, in this embodiment, rather than comparing a given email message to the previously reviewed email messages per se, the information contained within the email message is compared to the information contained within the previously reviewed email messages. Such a comparison is more nuanced and sophisticated, and ensures that an email message can be said to contain information that has already been exposed to the user even if the previous email that contained this information is significantly different.

The result of processing by the comparison and recommendation engine 508 is a tagging of an email message as containing information to which the user has already been exposed, or not containing information to which the user has already been exposed. (It is noted that the term "tagging" is used in this context, and throughout the patent application, in the sense that the email message is identified, or recognized, as containing information to which the user has already been exposed, such as by setting an appropriate flag, and so on. It is not meant to convey any other utilization of this term, such as mark-up language tags, and so on, as is found in the prior art.) On the basis of this recommendation, a replacement/deletion engine 512 performs additional functionality. As with the other engines, the engine 512 can be implemented in software, hardware, or a combination of hardware and software.

The engine 512 can perform three different functions. First, if the email message contains new information that the user has not previously seen, then the replacement/deletion engine 512 routes the email message to an input selection engine 516, as indicated by the arrow 511. The input selection engine 516, also implemented in hardware, software, or a combination of hardware and software, adds the email message to the email messages to be ultimately viewed within the email agent 502. Thus, email messages are first retrieved by the email agent 502 and sent to the system 500, but are not viewable by the user except as resent back to the email agent 502 by the input selection engine 516. The input selection engine 516 thus selects the input that the user is to see within the email agent 502.

Second, if the email message contains information that the user has already seen, then the replacement/deletion engine 512 may route the email message, as indicated by the arrow 513, to a select-and-feed replacement engine 514, which is similarly implemented in software, hardware, or a combination of hardware and software. The engine 514 selects a replacement email message to be viewed by the user, instead of the original email message received. Such an email message may simply be a placeholder email message that indicates that the original email message has been suppressed, with a link to where the original email message can be viewed if desired by the user. This new email message is then sent to the input selection engine 516 to send to the email agent 502 for viewing by the user. That is, the original email message is not sent, but rather a new, replacement email message is sent for viewing by the user.

Third, if the email message contains information that the user has already seen, then the replacement/deletion engine 512 may alternatively simply delete the email message. In this case, there is no further communication with the input selection engine 516, and the email message in question is never provided in any form to the email agent 502 for viewing by the user. Thus, in this embodiment, the user may not ever see, or be aware of, the email message that contains information that the user previously reviewed.

The techniques described in relation to the embodiment of FIG. 5 may be extended. For example, they may be employed in the context of Internet web page searching, so that in response to a search query, users are provided with at least substantially unique results. That is, web pages that contain substantially the same information as one another are removed, such that for any given set of information, typically only a single web page is shown to the user. For example, a given search query may be related to stucco-construction homes. Normally, all the search results for that search query would be provided to the user, so that the user has to navigate a large number of web pages, many of which may contain the same information. However, an embodiment of the invention compares the content within the web pages. For instance, if five web pages relate to how to build stucco-construction homes, then only one of these five web pages would be revealed to the user. If another three web pages relate to how to maintain stucco-construction homes, then only one of these three web pages would be revealed to the user. Similarly, if seven web pages relate to problems with stucco-construction homes, then only one of these seven web pages would be revealed to the user.

Furthermore, the information stored in the database 510 can be aged over time. For example, if the information within an email message is repeated within another email message an hour later, then in all likelihood the user will not want to see the second email message. However, if the information is repeated within another email message three weeks later, the user may want to see the information again. Thus, as information within the database 510 gets older, it may be deleted from the database 510. As such, the database 510 stores just relatively fresh information, and it no longer stores information of which the user him or herself may no longer be aware.

It is noted that the embodiment of the invention described in relation to email messages in this section of the detailed description is also amenable to implementation in relation to other types of content, such as other types of text, as well as audio and/or video. Likewise, the embodiment of the invention described in the next section of the detailed description in relation to audio and/or video is also amenable to implementation in relation to other types of content, such as email messages and other types of text. It is noted that the embodiment of the invention described in the next section of the detailed description provides for greater complexity than the embodiment of the invention described in this section of the detailed description. However, the less-complex embodiment of this section is nevertheless amenable to implementation in relation to audio and/or video, and similarly the more-complex embodiment of the next section is nevertheless amenable to implementation in relation to text, such as email messages.

Audio and/or Video Embodiment

Figure 6:
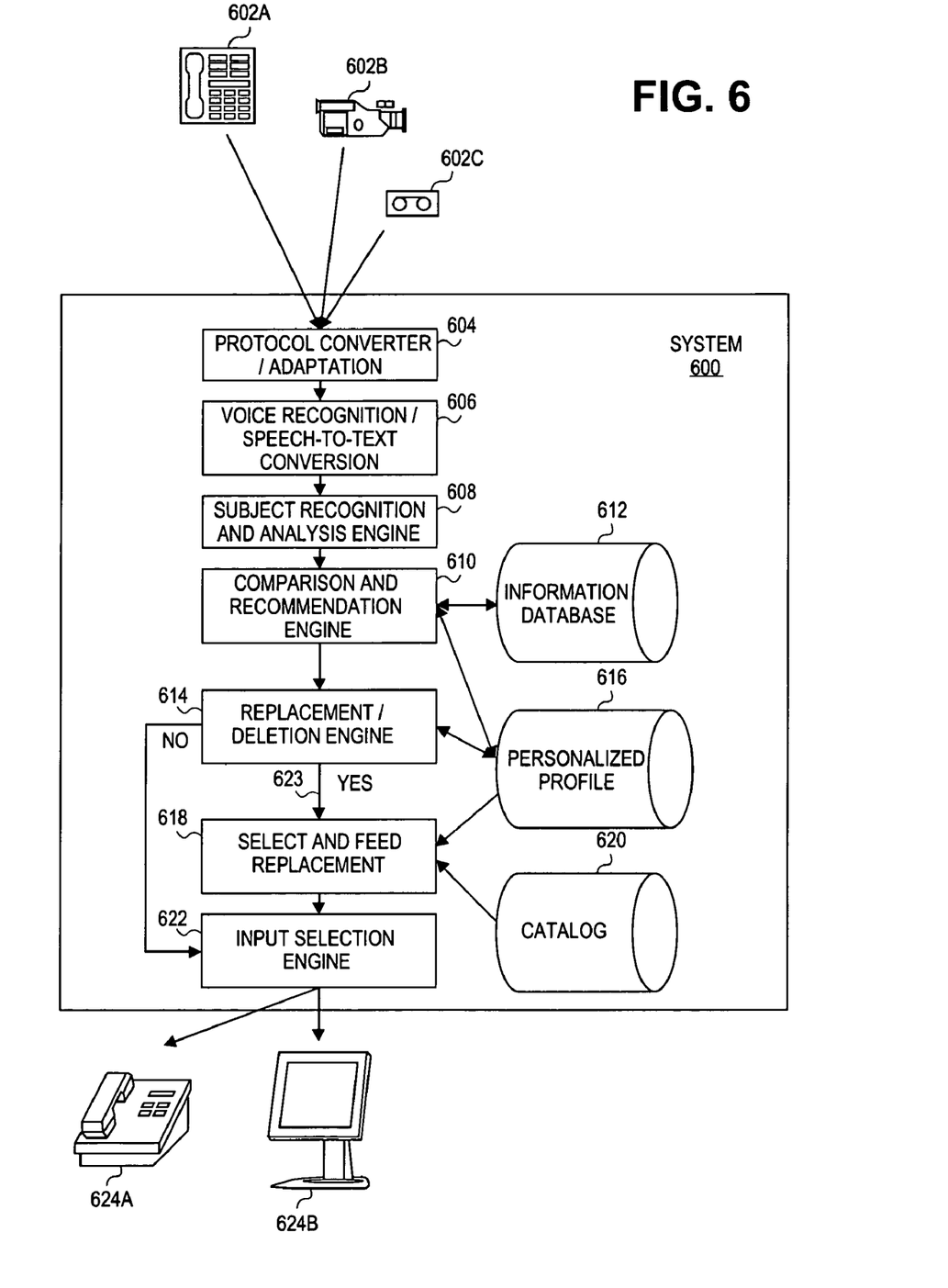
FIG. 6 is a diagram for revealing content to a user based on whether the user has been previously exposed to the content, where the content in question is audio and/or video, according to an embodiment of the invention.

FIG. 6 shows a system 600 that can be employed for revealing content to a user based on whether the user has previously reviewed the content, in relation to content that is audio and/or video, according to an embodiment of the invention. The system 600 is consistent with the system 200 of FIG. 2 that has been described. For instance, in one embodiment, the communication mechanism 202 of FIG. 2 can be or encompass the protocol converter/adaptation engine 604, the voice recognition/speech-to-text conversion engine 606, and the subject recognition and analysis engine 608 of FIG. 6. The parsing mechanism 204 of FIG. 2 can be or encompass the comparison and recommendation engine 610, the replacement/detection engine 614, and the select-and-feed replacement engine 618 of FIG. 6. Finally, the revelation mechanism 206 of FIG. 2 may be or encompass the input selection engine 622 of FIG. 6.

The system 600 is provided with an audio and/or video content stream, hereinafter referred to as a content stream, by one or more content source devices 602A, 602B, and 602C, collectively referred to as the content source devices 602. For instance, the content source device 602A is a telephone, providing a telephone call or a telephone conference call. The content source device 602B is a video recorder, providing video and also optionally audio. The content source device 602C is a tape player, such as a video or an audio tape player. The content source device 602C can further represent a storage device storing a taped event, such as a tape or video made of a conference call or event that is then stored, with a link to it on a web page, such that the device 602C is in such instance a storage device accessible over the Internet. Other content source devices can also be employed. For instance, a video program source device, such as a cable television box, a satellite television box, or a digital-video disc player may also be used.

The content stream, as it is input into the system 600, is kept fundamentally intact while the system 600 performs its processing. While the content stream is deconstructed and analyzed by the system 600, it is keyed back to the original stream, via time increments, packets, or by another approach. This allows the system 600 at a later point in time to select whether to feed the original content stream or a partial replacement content stream, as will be described.

The content stream is specifically input into a protocol converter/adaptation engine 604, which may be software, hardware, or a combination of software and hardware. For example, it may be desirable to render the original content stream into Voice over Internet Protocol (VoIP), or another protocol. Such conversion or adaptation is performed to simplify the performance of other parts of the system. The voice recognition/speech to text conversion engine 606, which also may be software, hardware, or a combination of software and hardware, provides further conversion. For instance, speech-to-text conversion is desirable so that subject recognition and analysis can later be performed more easily. Voice recognition can be performed to attempt to identify the current speaker, and so on.

In an embodiment relation to video content streams, the engines 604 and 606 may be replaced by an object/recognition classification engine. Such an engine is software, hardware, or a combination of software and hardware, and is able to identify and classify objects, such as in surveillance video and other types of video streams, to identify and remove relatively irrelevant background movement, such as trees moving in the wind. Objects thus identified as people can then have their own movements analyzed in order to identify and focus on their face, and face recognition can be employed to identify the person in question.

The converted content stream is then delivered to the subject recognition and analysis engine 608, which is software, hardware, or a combination of software and hardware. The engine 608, similar to the engine 506 of FIG. 5, divides the content stream into separate content stream portions, and potentially organizes them by subject matter, and so on. The comparison and recommendation engine 610, similar to the engine 508 of FIG. 5, compares each content stream portion against information that has been previously revealed to the user, as has been described. As such, the engine 610, which may be implemented in software, hardware, or a combination of software and hardware, may use a database 612 in a similar manner to which the engine 508 of FIG. 5 uses the database 510 of FIG. 5, as has been described.

The engine 610 is more sophisticated than the engine 508 of FIG. 5, however, in that it also relies upon a personalized profile 616. The personalized profile 616 allows a user, in the context of the comparison and recommendation engine 610, to indicate how the comparison of content stream portions against information that has been previously revealed to the user is to be accomplished. For example, the user may desire that subject matter is considered having been reviewed by him or her only in relation to the speaker that articulated the subject matter. That is, if one speaker within a teleconference discusses a given subject, another speaker within the conference discussing the same subject is not considered to be the same information as the first speaker because the speakers are different. Other types of personalization may also be achieved, such as how to age information stored in the database 612, and so on.

The result of processing by the comparison and recommendation engine 610 is a tagging of a content stream portion as containing information to which the user has already been exposed, or not containing information to which the user has already been exposed. On the basis of this recommendation, a replacement/deletion engine 614 performs additional functionality, similar to the functionality performed by the engine 512 of FIG. 5. The engine 614 may be implemented in software, hardware, or a combination of hardware and software.

The engine 614 performs two different functions. First, if the content stream portion in question contains new information that the user has not previously seen, then the replacement/deletion engine 614 routes this portion to an input selection engine 622, as indicated by the arrow 621. The engine 622, also implemented in hardware, software, or a combination of hardware and software, streams the original content stream unmodified to a content output device, such as one of the content output devices 624A and 624B. The content output devices 624A and 624B include a telephone 624A for listening to a telephone conference or audio, as well as a display device 624B for viewing video. Other types of content output devices may be employed as well. Thus, where the content stream portion in question contains new information, the engine 614 indicates to the engine 622 that this portion of the content stream should be exposed to the user without modification.

Second, if the content stream portion in question contains information that the user has already seen, then the replacement/deletion engine 614 requests that a select-and-feed replacement engine 618 select an alternative content stream portion to be exposed to the user, or otherwise that the content stream portion in question be modified. The engine 618 is similar to the engine 514 of FIG. 5 in this respect. The engine 618 may select an alternative audio stream or video stream, such as music, to forward to the input selection engine 622 to substitute for the content stream portion in question of the original content stream for output on the content output devices 624A and 624B. The engine 618 may alternatively indicate to the input selection engine 622 that the original content stream as to this content stream portion be modified when output to the content output devices 624A and 624B. For instance, the audio may be muted or played at a lower volume level.

The select-and-feed replacement engine 618 can select the replacement content stream to output in lieu of the content stream portion in question from a catalog 620 of such content streams. For instance, the catalog 620 may be a personalized collection of music selected by the user. The engine 618 may select from the catalog 620 at random, or as indicated by the personalized profile 616, in one embodiment.

It is noted that the replacement/deletion engine 614 in one embodiment does not perform the third functionality noted in respect to the replacement/deletion engine 512 of FIG. 5. Namely, the engine 614 in this embodiment does not delete the content stream portion in question when it contains information that the user has already seen, such that the input selection engine 622 is not requested to remove the content stream portion from the content stream. This is so that the user does not think that the content stream itself has ended. However, in another embodiment, the engine 614 can delete the content stream portion from the content stream, such that the input selection engine 622 is requested to remove the content stream portion from the content stream.

The input selection engine 622 thus can receive identifiers from the replacement/deletion engine 614 or the select-and-feed replacement engine 618 as to the starting and stopping points of the content stream that identify the current content stream portion. The engine 622 either passes through this portion of the content stream unaltered, deletes this portion, or replaces it with a replacement content stream, as indicated by the engines 614 and 618. Other ways to identify the current content stream portion may also be employed.

It is noted that some of the additional components of the system 600 of FIG. 6 can be applied to the email messages, or text, embodiment of the system 500 of FIG. 5. For instance, the personalized profile 616 and the catalog 620 may be used in conjunction with the engines 508, 512, and 514 of FIG. 5 in one embodiment, where the profile 616 indicates how the comparison is to be made by the engine 508 relative to the database 510, and the catalog 620 stores alternative email messages or text. Similarly, as has been alluded to, the system 500 of FIG. 5 can be used in relation to an audio and/or video stream embodiment. In such instance, the system 500 would operate in substantially the same manner as the system 600 of FIG. 6 has been described, but without the inclusion of the personalized profile 616 or the catalog 620.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:
1. A method comprising:
receiving a plurality of content items;
for each content item,
determining whether the content item was previously reviewed by a user;
where the content item was not previously reviewed, revealing the content item to the user; and,
where the content item was previously reviewed, hiding the content item from the user at least by playing or revealing alternative content instead of the content item,
wherein the alternative content is not part of the plurality of content items, and the alternative content consists of music,
and wherein determining whether the content item was previously reviewed by the user comprises, for a second content item received a length of time after a first content item is received, where both the first content item and the second content item pertain to a same subject matter of interest to the user:
where the length of time is less than a predetermined time threshold, setting a change threshold to a first value;
where the length of time is greater than the predetermined time threshold, setting the change threshold to a second value greater than the first value;
where a change in the second content item relative to the first content item is greater than the change threshold, concluding that the second content item was previously reviewed by the user; and,
where the change in the second content item relative to the first content item is less than the change threshold, concluding that the second content item was not previously reviewed by the user.

2. The method of claim 1, wherein receiving the plurality of content items over time comprises receiving the plurality of content items over a plurality of different media.

3. The method of claim 1, wherein receiving the plurality of content items over time comprises receiving a plurality of discrete content items.

4. The method of claim 3, wherein each discrete content item comprises at least one of: a text item; an email; a news article; a weblog item; a newsgroup item; an image; a web page; an audio item; a telephone message; and, a video item.

5. The method of claim 1, wherein receiving the plurality of content items over time comprises receiving a content stream, such that the content items are each a portion of the content stream in that the content stream is divisible into a plurality of portions, each portion corresponding to one of the content items.

6. The method of claim 5, wherein the content stream comprises at least one of: an audio stream; an audio recording; a telephone call; a conference call; a telephone message; a telephone recording; a conference call recording; a video stream; a video recording; a video program; a text stream; a text recording; and, a text message.

7. The method of claim 1, wherein determining whether the content item was previously reviewed by the user comprises determining whether the content item was displayed or announced to the user.

8. The method of claim 1, wherein determining whether the content item was previously reviewed by the user comprises determining whether the content item was selected by the user.

9. The method of claim 1, wherein determining whether the content item was previously reviewed by the user comprises determining whether the content item is an update of a previous content item, such that at least new portions of the content item are considered as not having been reviewed by the user.

10. The method of claim 1, wherein determining whether the content item was previously reviewed by the user comprises determining a length of time ago when the content item was previously reviewed by the user, such that the content item is considered as not having been reviewed by the user where the length of time ago when the content item was previously reviewed by the user exceeds a threshold, based on one or more parameters.

11. The method of claim 1, wherein revealing the content item to the user comprises one of displaying and announcing the content item to the user.

12. A system comprising:
a parsing mechanism to determine whether a user was previously exposed to each content item of a plurality of content items; and,
a revelation mechanism to reveal each content item to the user in one of at least two different manners, based on whether the user was previously exposed to each content item, where one of the two different manners comprises playing or revealing alternative content instead of the content item, such that the alternative content is played or revealed where the user was previously exposed to a given content item of the plurality of content items, instead of and in lieu of revealing the given content item;
wherein the parsing mechanism and the revelation mechanism are implemented at least in hardware,
wherein the alternative content is not part of the plurality of content items, and the alternative content consists of music,
and wherein the parsing mechanism is to determine whether the user was previously exposed to each content item of a plurality of content items by, for a second content item received a length of time after a first content item is received, where both the first content item and the second content item pertain to a same subject matter of interest to the user:
where the length of time is less than a predetermined time threshold, setting a change threshold to a first value;
where the length of time is greater than the predetermined time threshold, setting the change threshold to a second value greater than the first value;
where a change in the second content item relative to the first content item is greater than the change threshold, concluding that the user was previously exposed to the second content item; and,
where the change in the second content item relative to the first content item is less than the change threshold, concluding that the user was not previously exposed to the second content item.

13. The system of claim 12, further comprising a communication mechanism to receive the content items over a plurality of different media.

14. The system of claim 12, wherein the parsing mechanism is to determine the user was previously exposed to each content item based on at least one of:
whether the content item was selected by the user;
whether the content item is an update of a previous content item, such that at least new portions of the content item are considered as not having been reviewed by the user; and,
how long ago the user was previously exposed to the content item, such that the user is considered as not having been exposed to the content item where the user was previously exposed to the content item a length of time ago, based on one or more parameters.

15. An article of manufacture comprising:
a non-transitory and tangible computer-readable recordable data storage medium; and,
means in the medium for determining whether each of a plurality of content items was previously reviewed by a user, and for revealing each content item to the user in one of at least two different manners, based on whether the content item was previously reviewed by the user, where one of the two different manners comprises playing or revealing alternative content instead of the content item, such that the alternative content is played or revealed where the user was previously exposed to a given content item of the plurality of content items, instead of and in lieu of revealing the given content item;
wherein the alternative content is not part of the plurality of content items, and the alternative content consists of music,
and wherein the means is for determining whether each of the plurality of content items was previously reviewed by the user by, for a second content item received a length of time after a first content item is received, where both the first content item and the second content item pertain to a same subject matter of interest to the user:
where the length of time is less than a predetermined time threshold, setting a change threshold to a first value;
where the length of time is greater than the predetermined time threshold, setting the change threshold to a second value greater than the first value;
where a change in the second content item relative to the first content item is greater than the change threshold, concluding that the second content item was previously reviewed by the user; and,
where the change in the second content item relative to the first content item is less than the change threshold, concluding that the second content item was not previously reviewed by the user.

* * * * *